United States Patent
Xu et al.

(10) Patent No.: US 9,214,015 B2
(45) Date of Patent: Dec. 15, 2015

(54) SYSTEM FOR IMAGE ENHANCEMENT

(75) Inventors: Xinyu Xu, Camas, WA (US); Louis Joseph Kerofsky, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 200 days.

(21) Appl. No.: 13/435,407

(22) Filed: Mar. 30, 2012

(65) Prior Publication Data
US 2013/0257887 A1  Oct. 3, 2013

(51) Int. Cl.
| | |
|---|---|
| G09G 5/02 | (2006.01) |
| G06T 5/00 | (2006.01) |
| G09G 5/10 | (2006.01) |
| G09G 3/34 | (2006.01) |
| G09G 3/36 | (2006.01) |

(52) U.S. Cl.
CPC .................. *G06T 5/007* (2013.01); *G09G 5/10* (2013.01); *G09G 3/3406* (2013.01); *G09G 3/3611* (2013.01); *G09G 2320/0271* (2013.01); *G09G 2320/066* (2013.01); *G09G 2330/021* (2013.01); *G09G 2340/14* (2013.01); *G09G 2360/144* (2013.01); *G09G 2360/16* (2013.01)

(58) Field of Classification Search
None
See application file for complete search history.

(56) References Cited

U.S. PATENT DOCUMENTS

| | | | |
|---|---|---|---|
| 6,317,521 B1 | 11/2001 | Gallagher et al. | |
| 6,762,742 B2 | 7/2004 | Moon et al. | |
| 7,079,281 B1 | 7/2006 | Ng et al. | |
| 7,391,906 B2 | 6/2008 | Blake et al. | |
| 7,515,160 B2 | 4/2009 | Kerofsky | |
| 2006/0020203 A1 | 1/2006 | Tamura | |
| 2007/0041663 A1* | 2/2007 | Cho et al. | 382/299 |
| 2009/0109233 A1* | 4/2009 | Kerofsky et al. | 345/589 |
| 2009/0167673 A1 | 7/2009 | Kerofsky | |
| 2009/0184915 A1* | 7/2009 | Tsai et al. | 345/102 |
| 2010/0039414 A1 | 2/2010 | Bell | |
| 2010/0046814 A1* | 2/2010 | Dewaele et al. | 382/128 |
| 2010/0066874 A1 | 3/2010 | Ishiga | |
| 2010/0098339 A1 | 4/2010 | Kido | |
| 2010/0158330 A1* | 6/2010 | Guissin et al. | 382/128 |
| 2010/0183071 A1* | 7/2010 | Segall et al. | 375/240.16 |
| 2011/0096201 A1* | 4/2011 | Yoo et al. | 348/235 |
| 2011/0115815 A1 | 5/2011 | Xu et al. | |
| 2011/0216975 A1* | 9/2011 | Rother et al. | 382/173 |

OTHER PUBLICATIONS

International Search Report, mailed Jun. 11, 2013, PCT International Patent App. No. PCT/JP2013/002067, Sharp Kabushiki Kaisha, 4 pgs.

\* cited by examiner

*Primary Examiner* — Ming Hon
*Assistant Examiner* — Khoa Vu
(74) *Attorney, Agent, or Firm* — Chernoff Vilhauer McClung & Stenzel, LLP

(57) ABSTRACT

A system for image enhancement includes a computer receiving an input image, and modifies the entire range of frequencies of the image, wherein the modifying is greater for the lower frequency aspects of the input image relative to the higher frequency aspects of the input image based upon a brightening process that is based upon a brightening selection, where the brightening selection is based upon a backlight level of a display to display the input image. The computer modifies the higher frequency aspects of the input image based upon an enhancement process that is based upon the brightening selection which is based upon the backlight level of the display. The computer combines the modifies image based upon the brightening process and the modified image based upon the enhancement process.

18 Claims, 18 Drawing Sheets

SYSTEM FOR IMAGE ENHANCEMENT

FIELD OF THE INVENTION

The present invention relates generally to image enhancement.

BACKGROUND

Low-contrast viewing conditions may negatively impact, for example, through eyestrain and fatigue, the viewing experience of a user of an LCD device, for example, an LCD television, an LCD mobile device and other devices comprising an LCD display.

Low-contrast viewing conditions may arise when a device is used in an aggressive power-reduction mode, wherein the LCD backlight power level may be dramatically reduced making the image/video content appear dark and less visible to a viewer. The contrast of the image/video may be vastly reduced, or in some cases, pegged at black, and many image features that may convey important scene content may fall below the visible threshold.

Low-contrast viewing conditions may also arise when an LCD display is viewed under high ambient light, for example, direct sunlight. In these situations, the minimum display brightness that a viewer may perceive may be elevated due to the high ambient light in the surroundings. The image/video may appear "washed out" where it is intended to be bright, and the image/video may appear featureless in darker regions.

For both of the above-described low-contrast viewing scenarios, and other low-contrast viewing scenarios, the tonal dynamic range of the image/video may be compressed and the image contrast may be greatly reduced, thereby degrading the viewing experience of the user. Due to increasing consumer concern for reduced energy costs and demand for device mobility, it may be desirable to provide improved digital imagery and video quality to enhance the viewing experience under low-contrast viewing conditions.

BRIEF DESCRIPTION OF THE SEVERAL DRAWINGS

DETAILED DESCRIPTION OF EXEMPLARY EMBODIMENTS

Low-contrast viewing conditions may negatively impact, for example, through eyestrain and fatigue, the viewing experience of a user of an LCD device, for example, an LCD television, an LCD mobile device and other devices comprising an LCD display.

Figure 1:
FIG. 1 is a picture depicting an exemplary image under a low back-light-power viewing condition.

Low-contrast viewing conditions may arise when a device is used in an aggressive power-reduction mode, wherein the LCD backlight power level may be dramatically reduced making the image/video content appear dark and less visible to a viewer. The contrast of the image/video may be vastly reduced, or in some cases, pegged at black, and many image features that may convey important scene content may fall below the visible threshold. FIG. 1 depicts an exemplary image 10 displayed on a device operating under aggressive power-mode reduction.

Low-contrast viewing conditions may also arise when an LCD display is viewed under high ambient light, for example, direct sunlight. In these situations, the minimum display brightness that a viewer may perceive may be elevated due to the high ambient light in the surroundings. The image/video may appear "washed out" where it is intended to be bright, and the image/video may appear featureless in darker regions.

Figure 2:
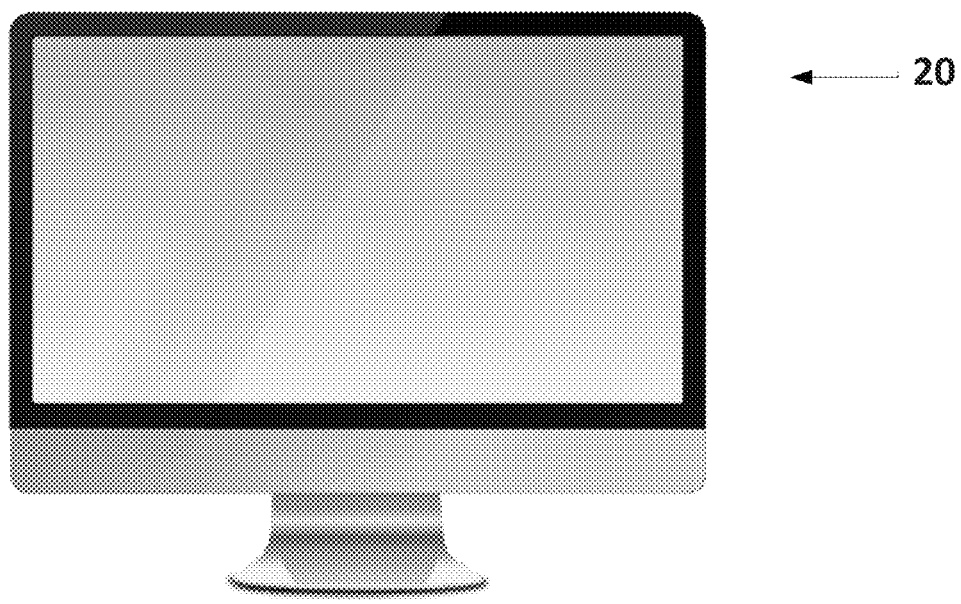
FIG. 2 is a picture depicting an exemplary image under a high ambient-light viewing condition.

FIG. 2 depicts an exemplary image 20 viewed with a mobile phone under high ambient lighting (direct sunlight).

For both of the above-described low-contrast viewing scenarios, and other low-contrast viewing scenarios, the tonal dynamic range of the image/video may be compressed and the image contrast may be greatly reduced, thereby degrading the viewing experience of the user. Due to increasing consumer concern for reduced energy costs and demand for device mobility, it may be desirable to provide improved digital imagery and video quality to enhance the viewing experience under low-contrast viewing conditions.

Figure 3:
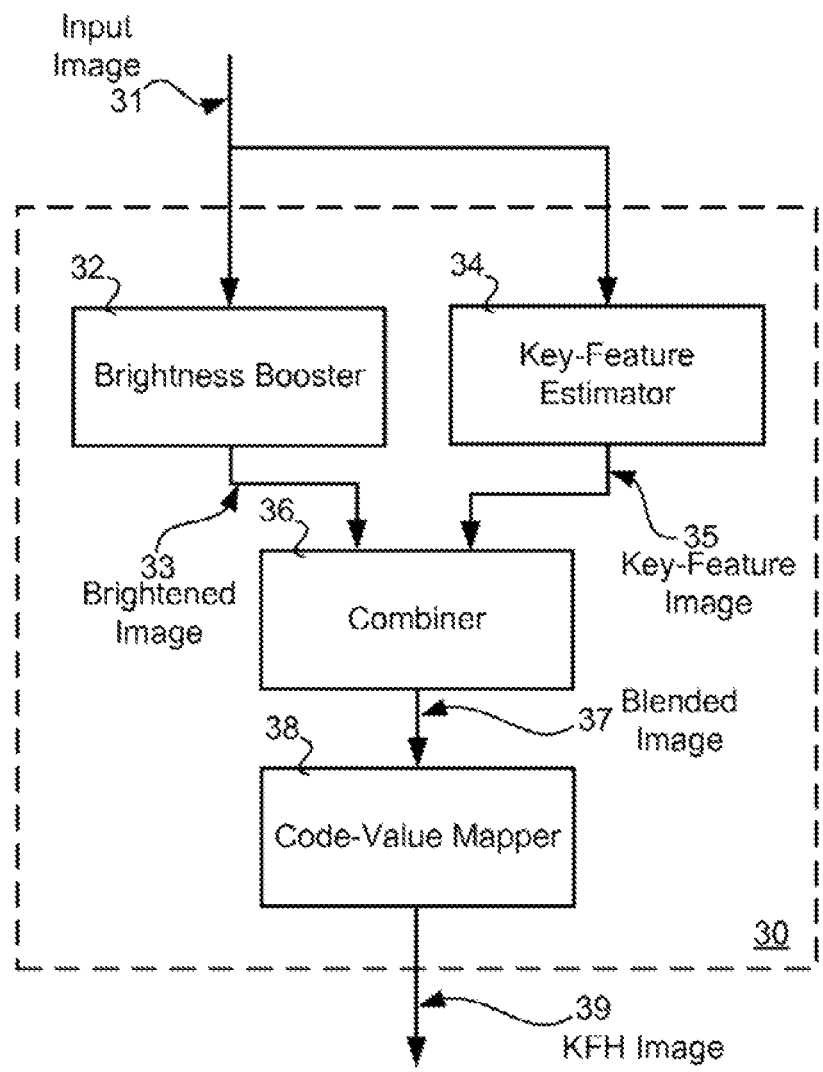
FIG. 3 is a chart showing a brightness booster for boosting the brightness level of an input image, a key-feature estimator for estimating a key-feature map associated with the input image and a combiner for combining the brightness-boosted image and the key-feature map.

Referring to FIG. 3 to increase the visibility of image/video features in low-contrast viewing conditions by highlighting key image features with Non-Photorealistic Rendering (NPR) techniques. This may include an image-enhancement system 30 comprising a brightness booster 32, a key-feature estimator 34, a combiner 36 and a code-value mapper 38. The image-enhancement system 30 may receive an input image 31 and may make the input image 31 available to the brightness booster 32 and the key-feature estimator 34. The input image 31 may be a color image, for example, an RGB image. The input image 31 may be a gray-scale image. The input image 31 may be a still image or a frame of a video sequence.

The brightness booster 32 may boost the brightness of the input image 31 using a brightness preservation technique, and the brightness booster 32 may generate a brightened image 33 that may be made available to the combiner 36. The brightness booster 32 may boost the brightness of the input image 31 based on information related to an LCD backlight associated with an LCD display on which the enhanced image may be displayed.

The key-feature estimator 34 may estimate a key-feature image 35, also referred to as a key-feature map, from the input image 31 and may make the key-feature image 35 available to the combiner 36.

The combiner 36 may blend the brightened image 33 and the key-feature image 35 to form a blended image 37 which may be made available to the code-value mapper 38. The code-value mapper 38 may form a key-feature-highlighted (KFH) image 39 by mapping the code-values generated by the combiner 36 into code values appropriate for an LCD, for example, to the range of [0,255]. The KFH image 39 may be made directly available to the LCD for display. The KFH image 39 may also be referred to as an NPR image.

Figure 4:
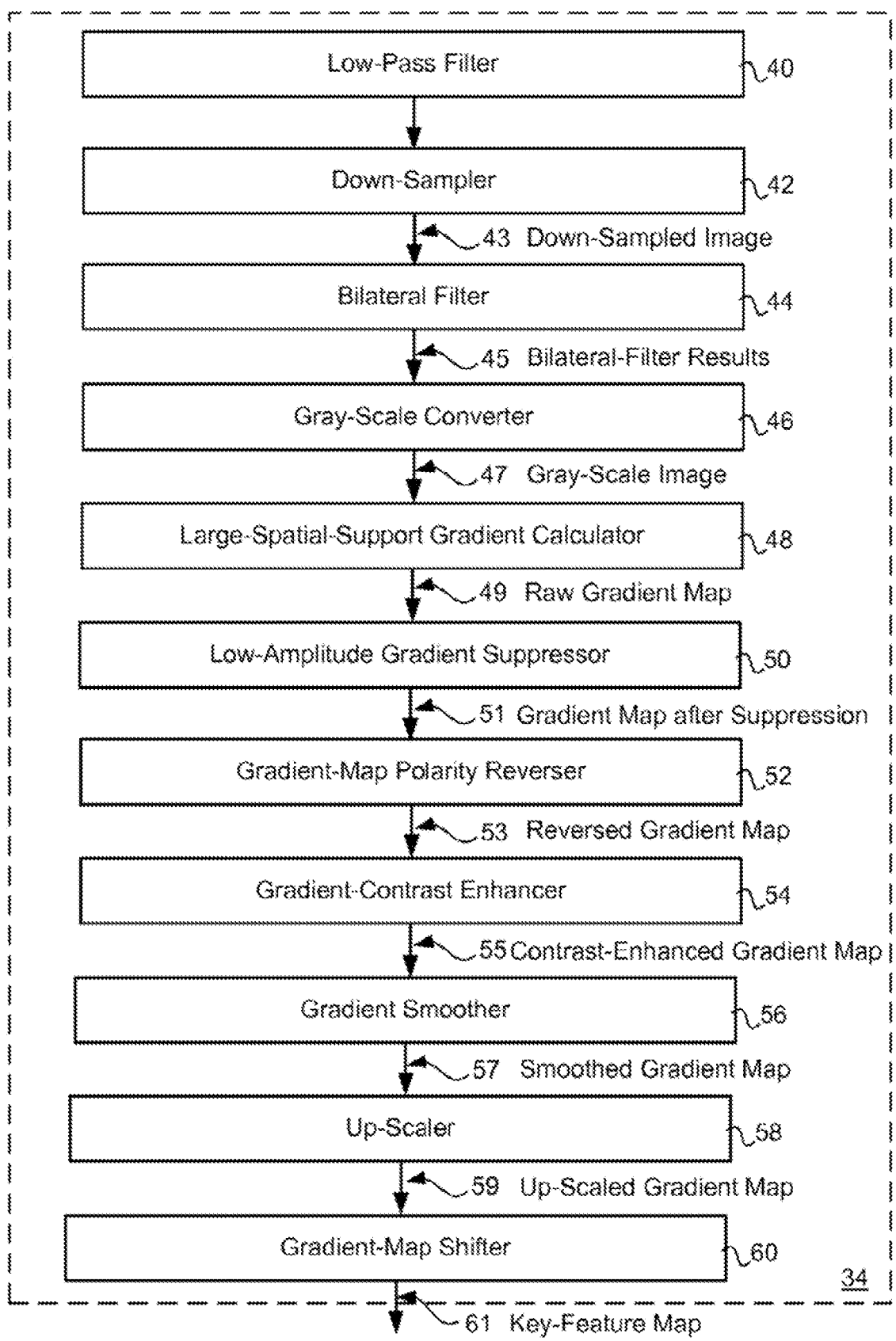
FIG. 4 is a chart showing a gradient estimator comprising a large-spatial-support gradient calculator.

Referring to FIG. 4, the key-feature estimator 34 may comprise a low-pass filter 40 and a down-sampler 42 for reducing, if necessary, the resolution of the input image to a resolution that may allow near real-time processing. Exemplary low-pass filters may include neighborhood pixel-value averaging, Gaussian smoothing, median blur filtering and other low-pass filters known in the art. A low-pass filter may be selected based on computational limitations and/or system resources. Exemplary down-samplers may comprise removal of image rows, removal of image columns, bilinear image resizing, bicubic image resizing, Gaussian pyramid down-samplers and other down-samplers. A down-sampler may be selected based on computational limitations and/or system resources. A key-feature estimator may not reduce the resolution of the input image, and may, therefore, not comprise a low-pass filter and a down-sampler.

The down-sampled image 43 may be made available to a bilateral filter 44 which may smooth less-textured areas. Major contours of objects within an image may convey important image information, while less-textured areas may be perceptually less important to a viewer. Thus bilateral filtering may be used to remove unnecessary gradient information, while retaining key edge information corresponding to object contours.

The results 45 of the bilateral filtering may be converted to gray-scale values by a gray-scale converter 46, and gradient estimation may be performed on the gray-scale image 47 by a large-spatial-support gradient calculator 48. Commonly used edge detectors, for example, the Sobel operator, the Canny edge detector and the Laplacian operator, may not effectively detect edges associated with major contours. Use of these common edge detectors may result in broken lines on major object contours. Additionally, minor edges may be detected in less-textured image areas, which may not be desirable in KFH rendering. Further, object boundaries in a gradient map generated using one of the commonly used edge detectors may not be well defined. The system may compute image gradients using a large spatial support and may retain, as edge pixels, only pixels with a large gradient value.

The large-spatial-support gradient calculator 48 may comprise a horizontal-gradient calculator and a vertical-gradient calculator. At each pixel in the gray-scale image 47, a horizontal-gradient value may be determined by the horizontal-gradient calculator and a vertical-gradient value may be determined by the vertical-gradient calculator. A gradient value may be assigned to a pixel based on the determined horizontal-gradient value and the determined vertical-gradient value associated with the pixel. The gradient value assigned to a pixel may be the largest of the horizontal-gradient value and the vertical-gradient value associated with the pixel.

Figure 5:
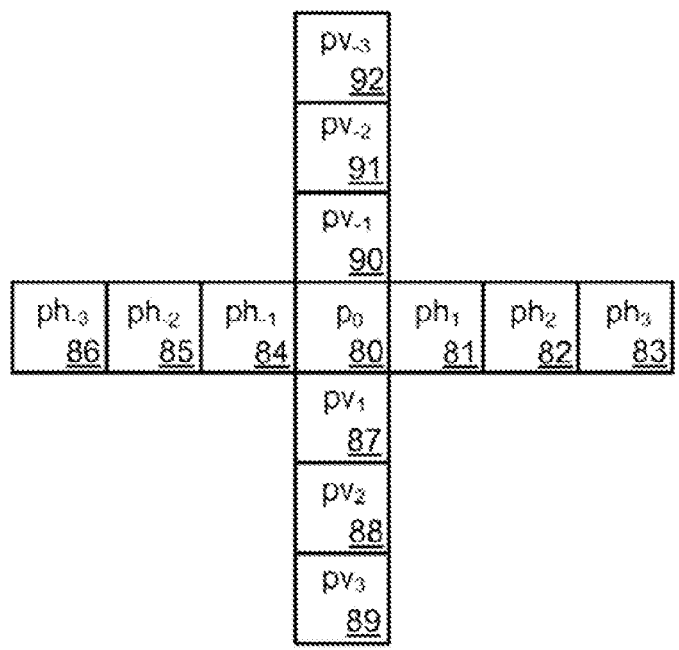
FIG. 5 is a picture depicting an exemplary large-spatial support, associated with a pixel location, used in a gradient calculation.

The horizontal-gradient value associated with a pixel may be determined by computing a first-order derivative at the pixel with respect to several horizontal neighbors in each direction, to the left and to the right, of the pixel. The largest derivative value in each direction may be added together to form the horizontal-gradient value associated with the pixel. Similarly, the vertical-gradient value associated with a pixel may be determined by computing a first-order derivative at the pixel with respect to several vertical neighbors in each direction, above and below, the pixel. The largest derivative value in each direction may be added together to form the vertical-gradient value associated with the pixel. The size of the one-dimensional search window associated with a direction (left, right, above, below) may be three pixels. FIG. 5 illustrates the large spatial support for an exemplary embodiment in which the one-dimension search window is three pixels. For a pixel denoted $p_0$ 80, the horizontal-gradient value, $\text{grad}_H(p_0)$, may be determined according to:

$$\text{grad}_H(p_0) = \max[D^1(p_0, ph_1), D^1(p_0, ph_2), D^1(p_0, ph_3)] + \max[D^1(p_0, ph_{-1}), D^1(p_0, ph_{-2}), D^1(p_0, ph_{-3})]$$

and the vertical-gradient value, $\text{grad}_V(p_0)$, may be determined according to:

$$\text{grad}_V(p_0) = \max[D^1(p_0, pv_1), D^1(p_0, pv_2), D^1(p_0, pv_3)] + \max[D^1(p_0, pv_{-1}), D^1(p_0, pv_{-2}), D^1(p_0, pv_{-3})]$$

where $D^1(\cdot, \cdot)$ may denote the first-order derivative and $ph_1$ 81, $ph_2$ 82 and $ph_3$ 83 are the pixels in the one-dimensional search window to the right of the pixel $p_0$ 80, $ph_{-1}$ 84, $ph_{-2}$ 85 and $ph_{-3}$ 86 are the pixels in the one-dimensional search window to the left of the pixel $p_0$ 80, $pv_1$ 87, $pv_2$ 88 and $pv_3$ 89 are the pixels in the one-dimensional search window below the pixel $p_0$ 80 and $pv_{-1}$ 90, $pv_{-2}$ 91 and $pv_{-3}$ 92 are the pixels in the one-dimensional search window above the pixel $p_0$ 80. The final raw gradient value, $\text{grad}(p_0)$, associated with the pixel $p_0$ 80 may be determined according to:

$$\text{grad}(p_0) = \max[\text{grad}_H(p_0), \text{grad}_V(p_0)],$$

thereby producing a raw gradient map 49.

Figure 6:
FIG. 6 is a picture depicting an input image.
Figure 7:
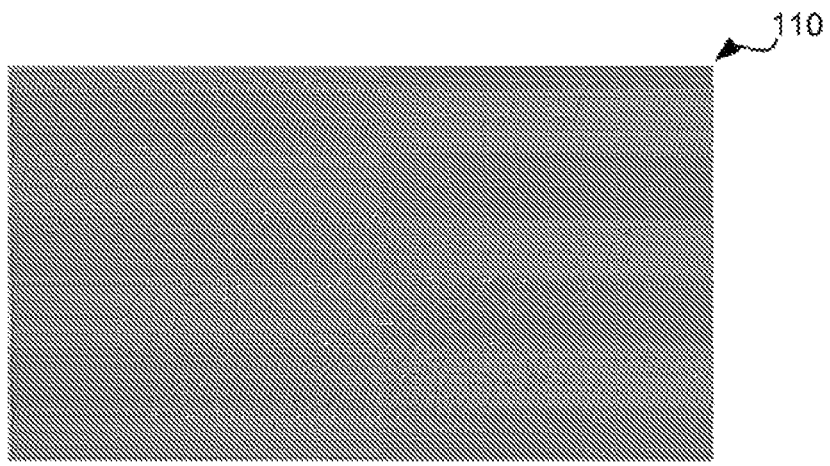
FIG. 7 is a picture depicting a raw gradient map for the exemplary input image shown in FIG. 6.

FIG. 6 shows an exemplary image 100, and FIG. 7 shows the resulting raw gradient map 110 for the exemplary image 100 shown in FIG. 6, using a three-pixel search window.

Figure 8:
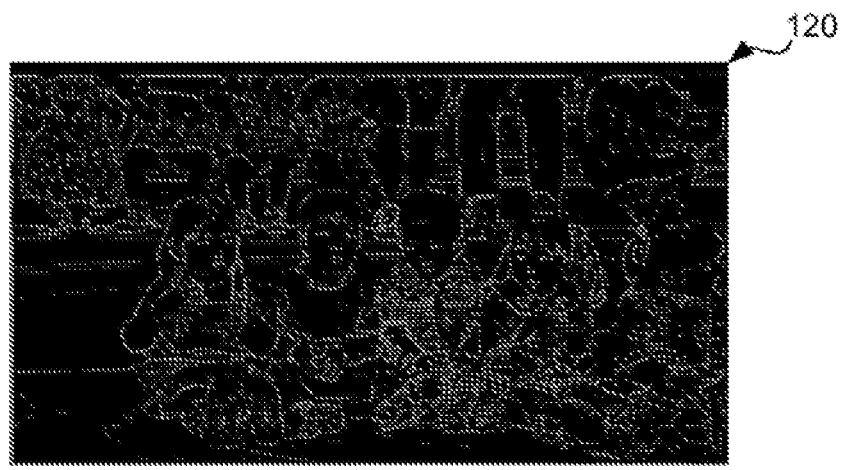
FIG. 8 is a picture depicting a gradient map after suppressing low-amplitude gradients in the raw gradient map shown in FIG. 7.

The raw gradient map 49 may contain noisy details. Therefore, the raw gradient map 49 may be made available to a low-amplitude gradient suppressor 50 which may remove low-amplitude gradients. The low-amplitude gradient suppressor 50 may comprise a comparator that compares the gradient amplitude to a threshold according to:

$$grad_{suppress}(p_0) = \begin{cases} grad(p_0), & grad(p_0) > T \\ 0, & \text{otherwise,} \end{cases}$$

where T may denote a threshold and $grad_{suppress}(p_0)$ may denote the low-amplitude-gradient-suppressed gradient map. The threshold may be set to T=5.0. The low-amplitude gradient suppressor 50 may comprise a zero-crossing detector, and pixel locations associated with zero-crossings may be retained in the gradient map, while non-zero-crossings may be suppressed. FIG. 8 shows the resulting gradient map 120 after suppressing low-amplitude gradients, by thresholding, in the raw gradient map 110 shown in FIG. 7.

Figure 9:
FIG. 9 is a picture depicting a reversed gradient map generated by polarity reversion applied to the exemplary gradient map shown in FIG. 8.

The low-amplitude-gradient-suppressed gradient map 51 may be made available to a gradient-map polarity reverser 52 that may reverse the gradient polarity according to:

$$grad_{rev}(p_0) = \text{offset} - grad_{suppress}(p_0),$$

where offset may denote an offset parameter that may be associated with white background and $grad_{rev}(p_0)$ may denote the reversed gradient map. The parameter offset may be determined empirically, such as offset=120. FIG. 9 shows the outcome 130 of polarity reversion applied to the exemplary gradient map 120 shown in FIG. 8.

The reversed gradient map 53 may be made available to a gradient-contrast enhancer 54 that may improve the contrast of the reversed gradient map 53 and may map the gradient values to the range of 0 to 255. The gradient-contrast enhancer 54 may map the reversed gradient values according to:

$$grad_{enhanced}(p_0) = \begin{cases} 255, & grad_{rev}(p_0) = \text{offset} \\ 0, & grad_{rev}(p_0) \leq 0 \\ grad_{rev}(p_0) + \text{shift}, & 0 < grad_{rev}(p_0) < \text{offset,} \end{cases}$$

where shift may denote a contrast shift and $grad_{enhanced}(p_0)$ may denote the contrast-enhanced gradient map. The parameter shift may be determined empirically, such as shift=120.

The gradient-contrast enhancer 54 may produce a binary gradient map according to:

$$grad_{enhanced}(p_0) = \begin{cases} 255, & grad_{rev}(p_0) = \text{offset} \\ 0, & grad_{rev}(p_0) < \text{offset.} \end{cases}$$

Figure 10:
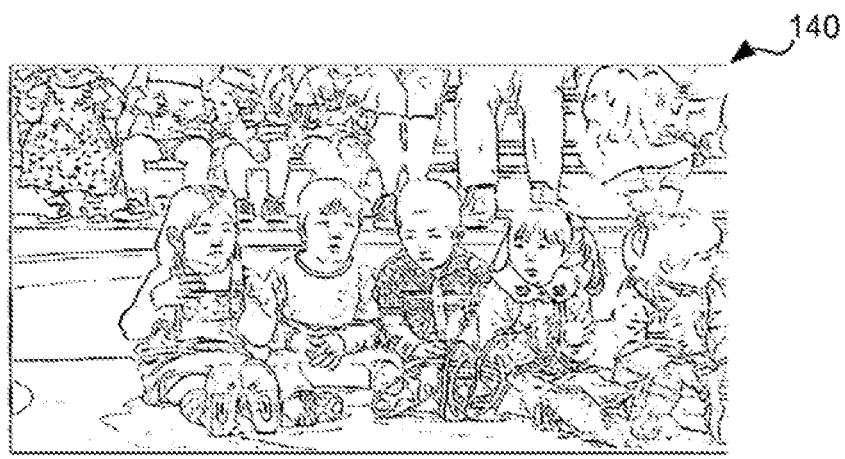
FIG. 10 is a picture depicting a contrast-enhanced gradient map associated with the reversed gradient map shown in FIG. 9.

FIG. 10 shows the outcome 140 of gradient-contrast enhancement applied to the exemplary reversed gradient map 130 shown in FIG. 9.

Figure 11:
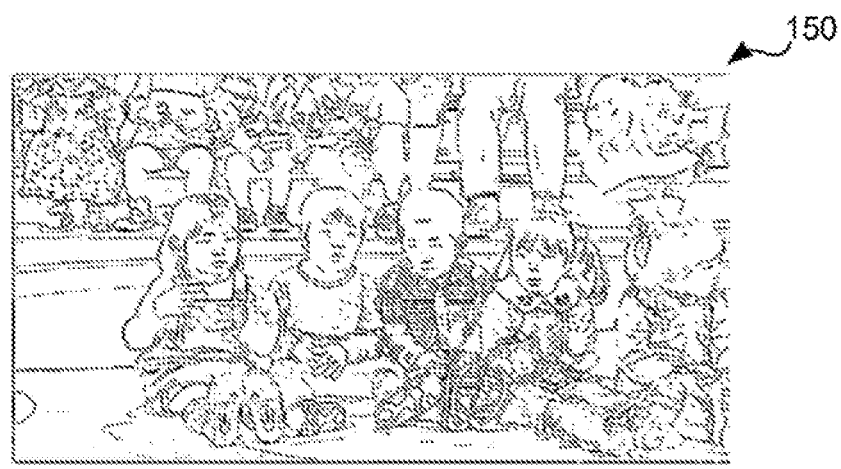
FIG. 11 is a picture depicting the effect of gradient smoothing applied to the contrast-enhanced gradient map shown in FIG. 10.

The contrasted-enhanced gradient map 55 may be made available to a gradient smoother 56 that may blur the boundary between foreground edges and white background and may link broken lines. The gradient smoother 56 may comprise a Gaussian low-pass filter. The kernel size of the Gaussian low-pass filter may be 3×3. FIG. 11 shows the effect 150 of gradient smoothing applied to the exemplary contrast-enhanced gradient map 140 shown in FIG. 10.

The smoothed gradient map 57 may be made available to an up-scaler 58 that may scale the smoothed gradient map 57 to the original input image resolution. The up-scaled gradient map 59 may be made available to a gradient-map shifter 60 that may shift the background of the gradient map to zero. The gradient-map shifter 60 may subtract 255 from the up-scaled gradient values to shift the background to zero. The resulting key-feature map 61 may be made available from the key-feature estimator 34 to the combiner 36.

Referring to FIG. 3, the brightness booster 32 may boost the brightness of the input image 31 using a linear scaling factor, also referred to as a scaling factor, a boosting factor, a brightening factor and a brightness-boosting factor. The linear scaling factor may be determined such that the brightness is preserved under a predetermined percentage of backlight dimming according to:

$$S = \left(\frac{1}{BL_{reduced}}\right)^{\frac{1}{\gamma}},$$

where S may denote the scaling factor, $BL_{reduced}$ may denote the percentage of backlight dimming and $\gamma$ may denote the LCD system gamma. $BL_{reduced}$ may be a predetermined fixed percentage, for example, 15 percent. The scaling factor, S, may be determined adaptively based on image content. The scaling factor, S, may be computed using the color histogram of the input image. The percentage of backlight dimming, $BL_{reduced}$, may be determined as desired. For example, the percentage of backlight dimming, $BL_{reduced}$, may be determined according to the methods and systems disclosed in U.S. patent application Ser. No. 11/465,436, entitled "Systems and Methods for Selecting a Display Source Light Illumination Level," filed Aug. 17, 2006, which is hereby incorporated by reference herein in its entirety.

Figure 12:
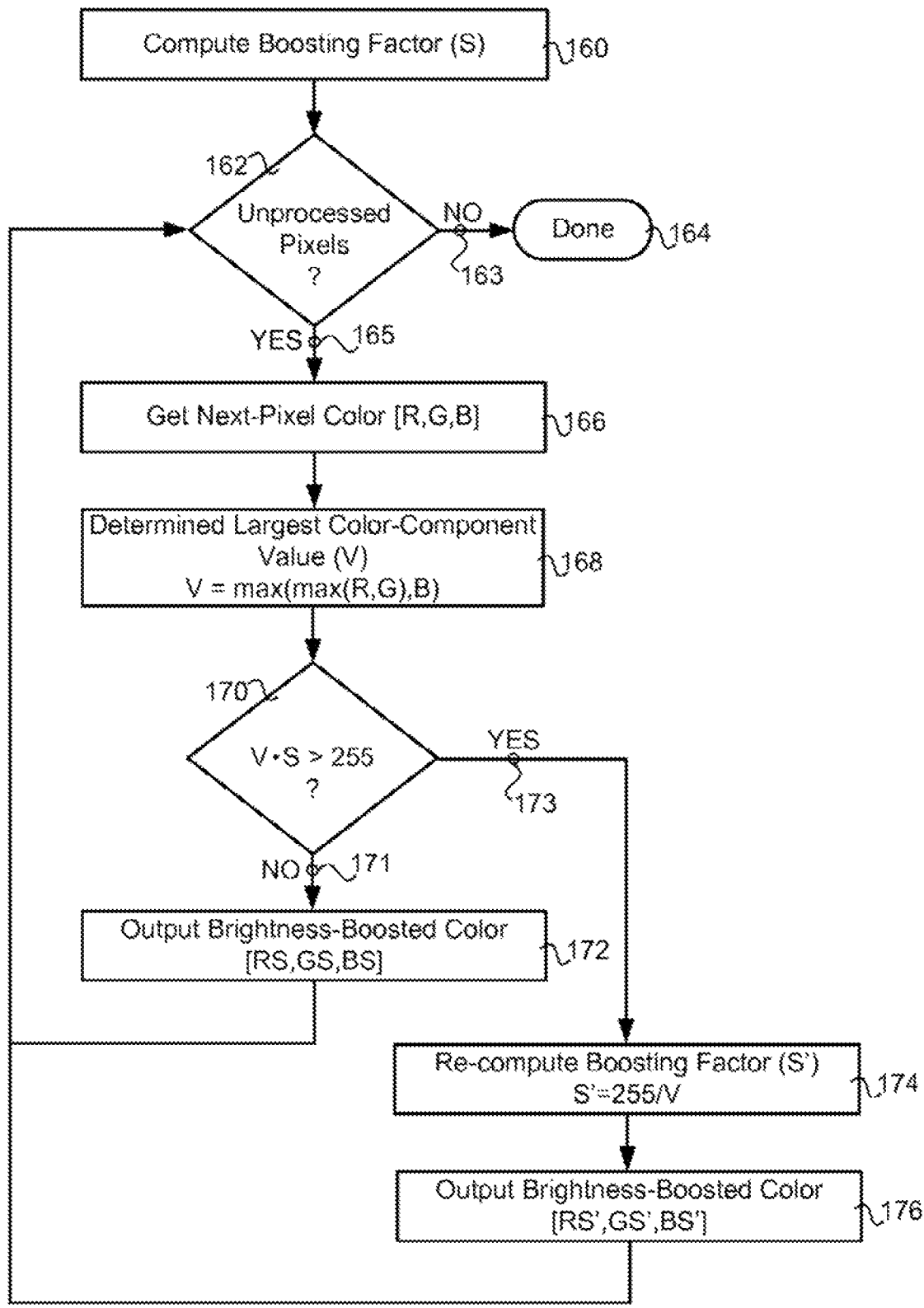
FIG. 12 is a chart showing a brightness-boosting factor that maintains the color ratio across three color channels when clipping occurs.

To avoid a clipping problem, the brightness boosting may comprise per-pixel processing described in relation to FIG. 12. The boosting factor, S, may be computed 160, and a determination 162 may be made as to whether or not there are unprocessed pixels. If there are no 163 unprocessed pixels, then the brightness boosting procedure may terminate 164. If there are 165 unprocessed pixels, then the color-component values, denoted [R, G, B] of the next pixel may be obtained 166. The largest color-component value, which may be denoted V, may be determined 168. V may be determined according to:

$$V = \max(\max(R, G), B).$$

The largest color-component value, V, may be scaled by the boosting factor, S, and the scaled value may be compared 170 to the maximum code value. The maximum code value may be 255. If the scaled value is less than or equal to 171 the maximum code value, the color value associated with the current pixel may be brightness boosted using the scale value, S, and the brightness-boosted color value may be output 172 for the current pixel. A determination 162 may be made as to whether or not there are unprocessed pixels, and the process may continue. If the scaled value is greater than 173 the maximum code value, then the boosting factor may be re-computed according to:

$$S' = \frac{255}{V},$$

where S' may denote the re-computed boosting factor. The color value associated with the current pixel may be brightness boosted using the re-computed boosting factor, S', and the brightness-boosted color value may be output 176 for the current pixel. A determination 162 may be made as to whether or not there are unprocessed pixels, and the process may continue. The color ratio across the three color channels is maintained when clipping occurs, and thus color fidelity is maintained.

A common brightening factor, S, may be used at each pixel, with the exception of pixels for which clipping occurs. The brightening factor, S, may be spatially varying according to image content. The brightening factor, S, may be determined according to:

$$S(x,y) = \left(\alpha + \exp\left(-\frac{f(x,y)^2}{\sigma^2}\right)\right), \alpha \geq 1,$$

where f(x,y) may be the image brightness at location (x,y), α may be a parameter that controls the range of the brightening factor and σ may be a factor that controls the shape of the Gaussian weighting function. For f(x,y) with a range of [0,255], exemplary parameter values of α and σ are 1.6 and 100, respectively. The Gaussian weighting function may produce a larger boosting factor, S(x,y), when the brightness f(x,y) is low. Therefore, a pixel with a low-brightness value may be more heavily brightened than a pixel with a larger brightness value.

The image brightness values may be quantized into a plurality of brightness-value bins, and a brightening factor may be associated with each brightness-value bin. Pixels with brightness values within the same brightness-value bin may be brightened by the same factor, the brightening factor associated with the respective bin. The quantization may be based on a histogram of the brightness values.

RGB input values may be converted to an alternative color space, for example, a luminance-chrominance-chrominance color space. Exemplary luminance-chrominance-chrominance color spaces may include YCbCr, YUV, Lab and other luminance-chrominance-chrominance color spaces. The luminance channel may be brightness boosted while the chrominance channels remain unchanged.

The brightened image 33 generated by the brightness booster 32 and the key-feature image 35 generated by the key-feature estimator 34 may be combined by the combiner 36. The combiner 36 may combine the brightened image 33 and the key-feature image 35 by adding the two images. The combiner 36 may blend the images using a weighted average of the two images according to:

$$I_{KFH} = \beta I_{boosted} + (1-\beta) I_{KFM},$$

where β may denote a blending factor, also referred to as a blending parameter, $I_{KFH}$ may denote the blended image 37, $I_{boosted}$ may denote the brightened image 33 generated by the brightness booster 32 and $I_{KFM}$ may denote the key-feature image 35 generated by the key-feature estimator 34. The blending factor, β, may be a user selected parameter. In alternative embodiments of the present invention, the blending factor, β, may be a predefined value.

The blended image 37 values may be mapped by a code-value mapper 38 to the range of display code values. The range of display code values is [0,255]. The resulting KFH image 39 may be made available from the image-enhancement system 30 to an LCD display.

Figure 13:
FIG. 13 is a picture depicting a Non-Photorealistic Rendering (NPR) rendition of the input image at full power consumption, shown in FIG. 6.
Figure 14:
FIG. 14 is a picture depicting an NPR rendition of the exemplary input image, at 2% power consumption, shown in FIG. 6.
Figure 15:
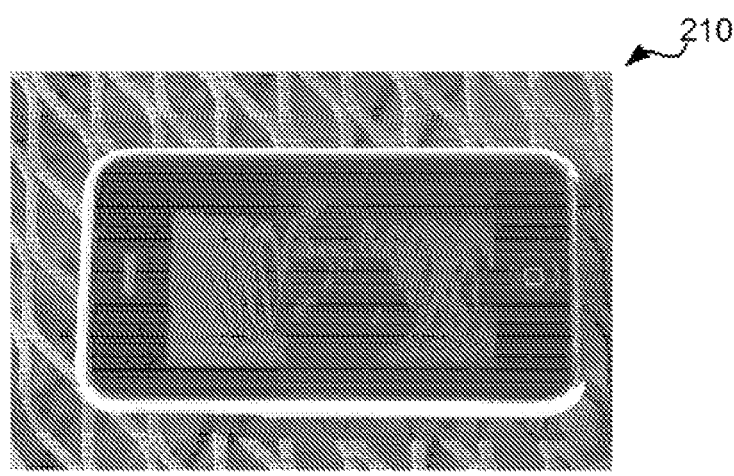
FIG. 15 is a picture depicting an NPR rendition of the exemplary input image, viewed in direct sunlight, shown in FIG. 2.

FIG. 13 depicts the NPR rendition 190 of the input image 100, at full power consumption, shown in FIG. 6. FIG. 14 depicts the NPR rendition 200 of the input image 100, at 2% power consumption, shown in FIG. 6. FIG. 15 depicts the NPR rendition 210 of the input image 20, viewed in direct sunlight, shown in FIG. 2.

Figure 16:
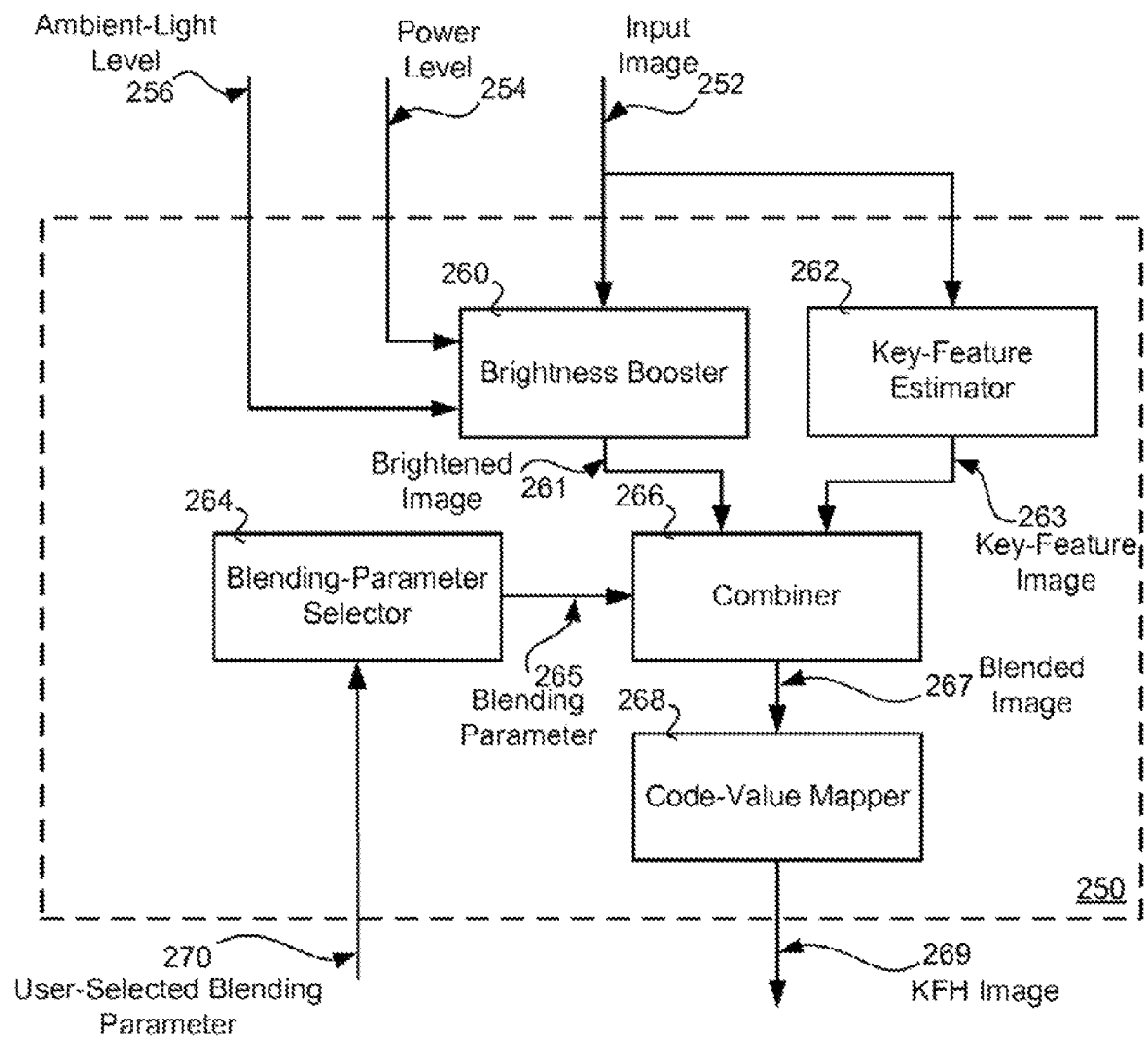
FIG. 16 is a chart showing a brightness booster for boosting the brightness level of an input image, a key-feature estimator for estimating a key-feature map associated with the input image, a combiner for combining the brightness-boosted image and the key-feature map and a blending-parameter selector for determining a blending parameter that is used by the combiner.

Referring to FIG. 16, the system may comprise a brightness booster 260, a key-feature estimator 262, a blending-parameter selector 264, a combiner 266 and a code-value mapper 268. An input image 252, a backlight power level 254 and an ambient-light level 256 may be received by the image-enhancement system 250. The input image may be a color image or a gray-scale image. The input image 252 may be made available to the brightness booster 260 and the key-feature estimator 262. The backlight power level 254 and the ambient-light level 256 may be made available to the brightness booster 260.

The key-feature estimator 262 may produce a key-feature image 263, also considered a key-feature map, associated with the input image 252. The key-feature estimator 262 may generate the key-feature map 263.

The brightness booster 260 may generate a brightened image 261 based on the input image 252 content, the backlight power level 254 and the ambient-light level 256.

The blending-parameter selector 264 may determine the blending parameter 265 used by the combiner 266 to blend the brightened image 261 and the gradient map 263. A user-selected blending parameter 270 may be provided to the blending-parameter selector 264. The user-selected blending parameter 270 may correspond directly to the blending parameter 265. The user-selected blending parameter 270 may be an image-quality setting selected by a user and associated with a blending parameter 265 value by the blending-parameter selector 264. The blending-parameter selector 264 may select a default value for the blending parameter 265 when a user-selected blending parameter 270 is not available.

The combiner 266 may combine the key-feature image 263 and the brightened image 261 based on the blending parameter 265. The combiner 266 may linearly blend the key-feature image 263 and the brightened image 261 using the blending parameter 265 as a weighting factor according to:

$$I_{KFH} = \beta I_{boosted} + (1-\beta) I_{KFM},$$

where β may denote the blending parameter 265, $I_{KFH}$ may denote the blended image 267, $I_{boosted}$ may denote the brightened image 261 generated by the brightness booster 260 and $I_{KFM}$ may denote the key-feature image 263 generated by the key-feature estimator 262. The combiner 266 may combine the key-feature image 263 and the brightened image 261 according to:

$$I_{KFH} = I_{boosted} + I_{KFM}.$$

The blended image 267 values may be mapped by a code-value mapper 268 to the range of display code values. The range of display code values may be [0,255]. The resulting KFH image 269 may be made available from the image-enhancement system 250 to an LCD display.

While the aforementioned techniques are suitable for brightening an image, the edges and/or details tend to be lost due to the tone scale manipulation of the image brightening process. In many applications, such as digital signage and mobile displays, it is desirable to preserve edges and details during the image brightening process such that the brightened image maintains sufficient crispiness and contrast while having increased brightness to be readily readable at high ambient lighting conditions.

Figure 17:
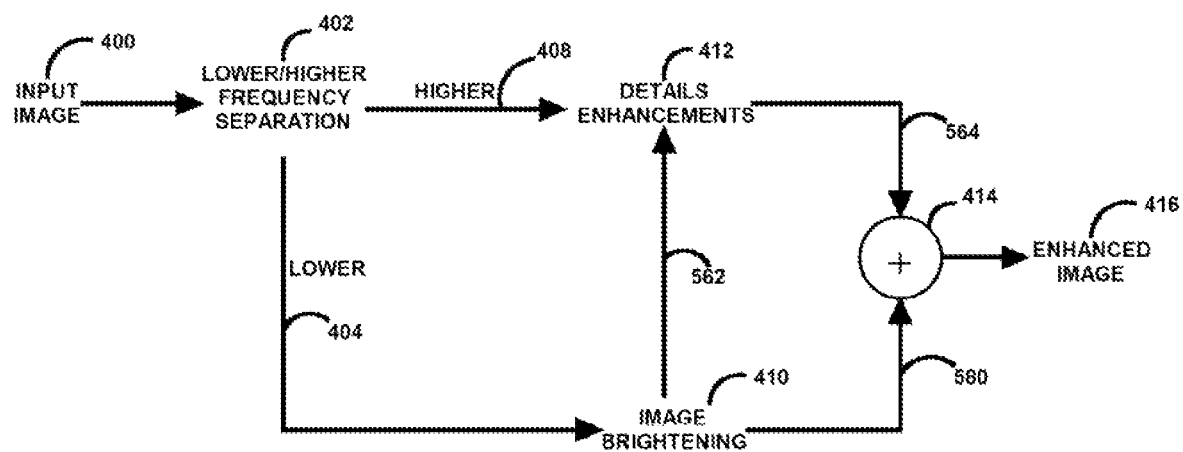
FIG. 17 illustrates image separation with details enhancements and image brightening.

Referring to FIG. 17, an input image 400 is received by the system and it was determined that the relatively higher frequency aspects of the input image should be processed by the system in a manner different than the relatively lower frequency aspects of the input image. The relatively lower frequency aspects of the input image tend to identify the smooth aspects of the image while the relatively higher frequency aspects of the input image tend to identify the texture and edge aspects of the input image. To separate the relatively higher frequency aspects of the input image from the relatively lower frequency aspects of the input image, any suitable separation technique (e.g., filtering) 402 may be used. The output of the separation technique 402 is the relatively lower frequency aspects 404 of the input image 400 and the relatively higher frequency aspects of the input image 408.

The relatively lower frequency aspects of the input image 404 are brightened by using an image brightening process 410. The relatively higher frequency aspects of the input image 408 are enhanced by using a details enhancement process 412. The output of the image brightening process 410 and the details enhancement process 412 are combined 414 to provide the resulting enhanced image 416.

Figure 18:
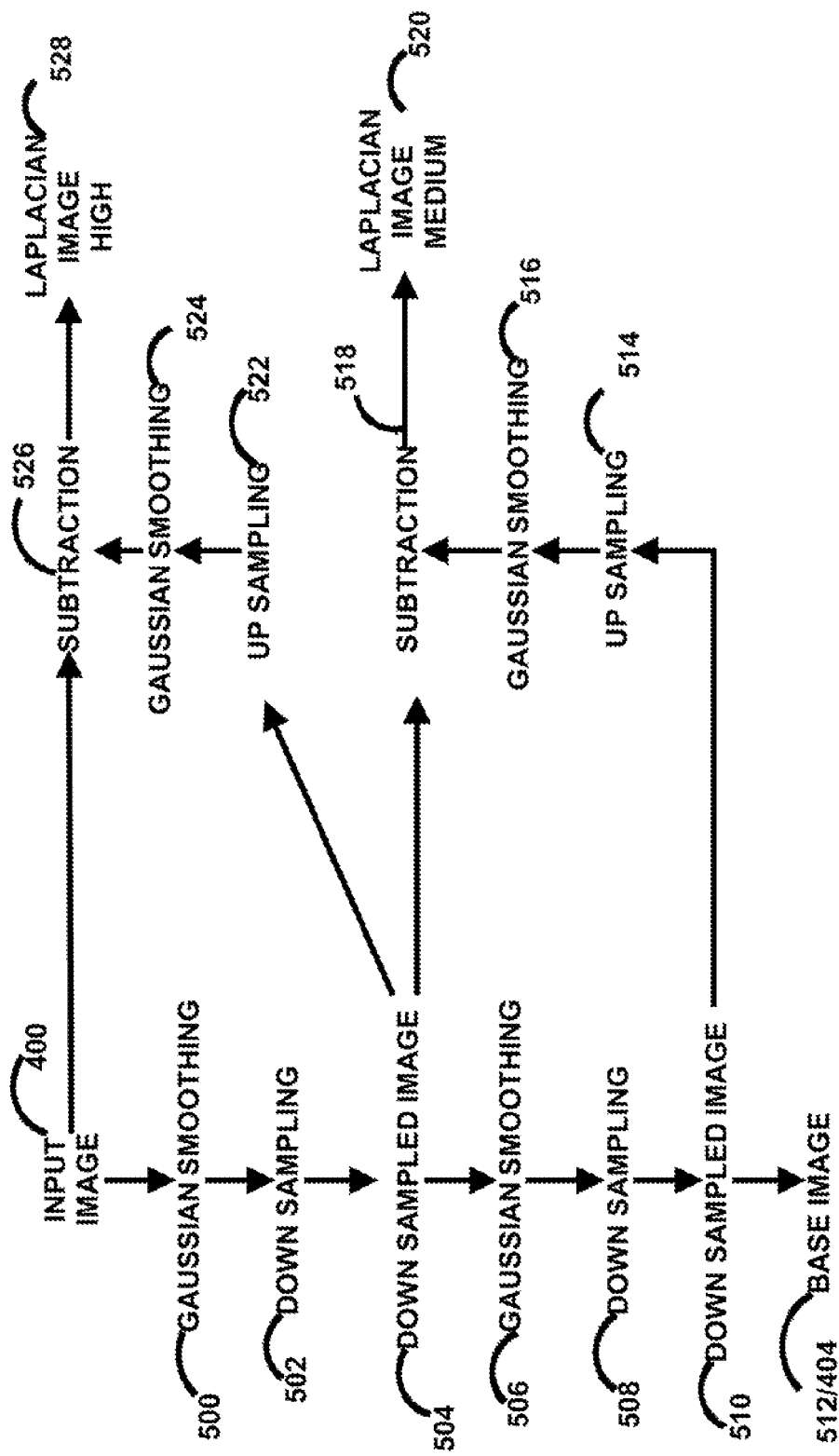
FIG. 18 illustrates a multi-level image separation technique.

Referring to FIG. 18, the separation technique 402 may use a multi-scale pyramid decomposition with Gaussian and Laplacian pyramid. The input image 400 is smoothed using a Gaussian smoothing process 500. The Gaussian smoothed image from the Gaussian smoothing process 500 may be down sampled 502 to create a down sampled image 504. The down sampled image 504 is smoothed using a Gaussian smoothing process 506. The Gaussian smoothed image from the Gaussian smoothing process 506 may be down sampled 508 to create a down sampled image 510. The down sampled image 510 may be provided as the relatively lower frequency aspects 404 of the input image 400. The Gaussian smoothing tends to reduce aliasing.

The down sampled image 510 may be up sampled 514. The up sampled image from the up sampling 514 may be Gaussian smoothed 516. The Gaussian smoothed image from the Gaussian smoothing 516 may be subtracted from the down sampled image 504 to create a Laplacian image 520 having a medium set of details. The down sampled image 504 may be up sampled 522. The up sampled image from the up sampling 522 may be Gaussian smoothed 524. The Gaussian smoothed image from the Gaussian smoothing 524 may be subtracted from the input image 400 to create a Laplacian image 526 having a high set of details. The Laplacian image 528 may be provided as the relatively higher frequency aspects 408 of the input image 400.

Figure 19:
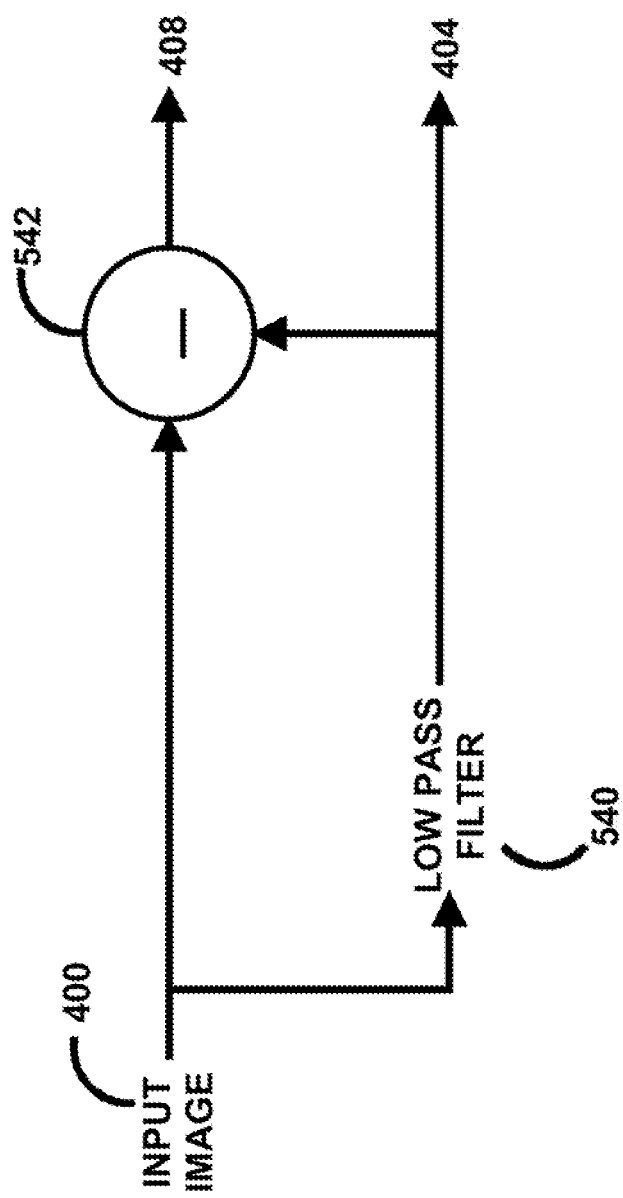
FIG. 19 illustrates a low pass filter based image separation technique.

Referring to FIG. 19, the separation technique may use a low pass filter 540 on the input image 400. The low pass filtered input image may be the relatively lower frequency aspects 404 of the input image 400. The relatively lower frequency aspects 404 of the input image 400 may be subtracted 542 from the input image 400 to determine the relatively higher frequency aspects 408 of the input image 400. For example, the low pass filter 540 may be a Gaussian filter, a bilateral filter, and/or a Sieve filter. Alternatively, a high pass filter may be used.

Figure 20:
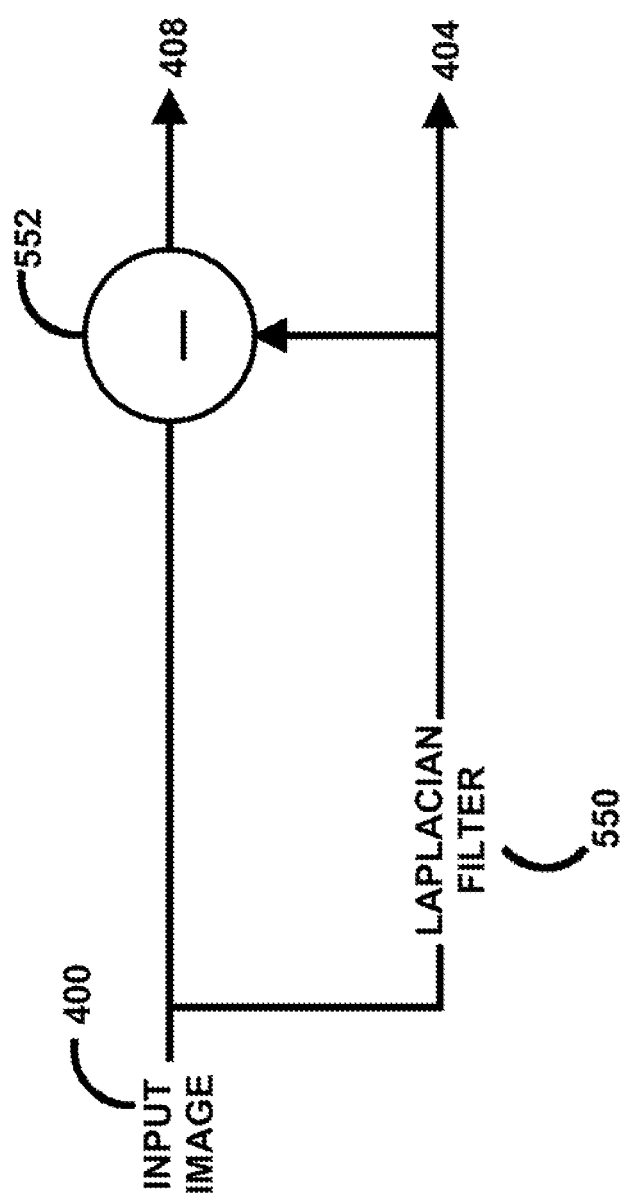
FIG. 20 illustrates a Laplacian filter based image separation technique.

Referring to FIG. 20, the separation technique may use a single scale Laplacian filter 550 on the input image 400. The Laplacian filtered input image may be the relatively lower frequency aspects 404 of the input image 400. The relatively lower frequency aspects 404 of the input image 400 may be subtracted 552 from the input image 400 to determine the relatively higher frequency aspects 408 of the input image 400. For example, the Laplacian filter may use a 3×3 filter kernel such as $$\begin{matrix} 1 & 1 & 1 \\ 1 & -8 & 1 \\ 1 & 1 & 1. \end{matrix}$$

For example, the Laplacian filter may use a 3×3 filter kernel such as $$\begin{matrix} 0 & 1 & 0 \\ 1 & -4 & 1 \\ 0 & 1 & 0. \end{matrix}$$

Figure 21:
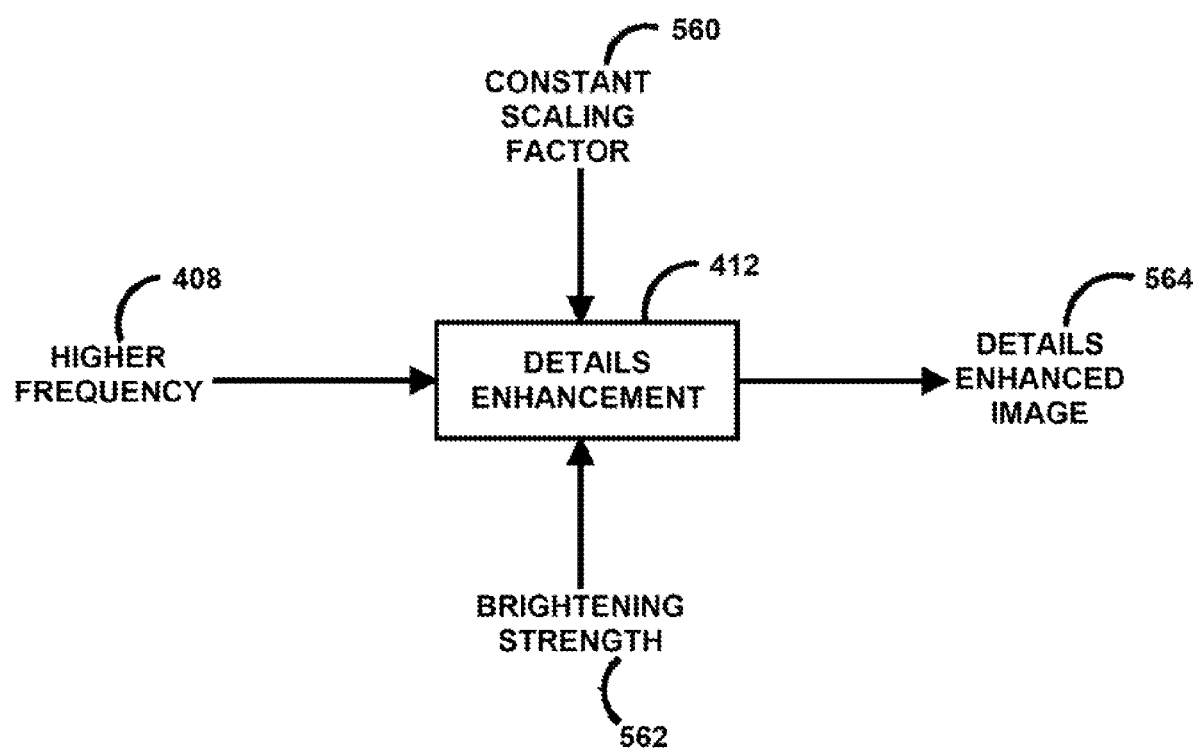
FIG. 21 illustrates a details enhancement technique.

Referring to FIG. 21, the details enhancement 412 receives the relatively higher frequency aspects 408 of the input image 400. The details enhancement 412 receives a constant scaling factor 560. The details enhancement 412 receives a brightening strength 562 from the image brightening process 410. The details enhancement 412 may modify the relatively higher frequency aspects 408 of the input image 400 by the constant scaling factor 560 and/or the brightening strength 562 to provide a details enhanced image 564.

Figure 22:
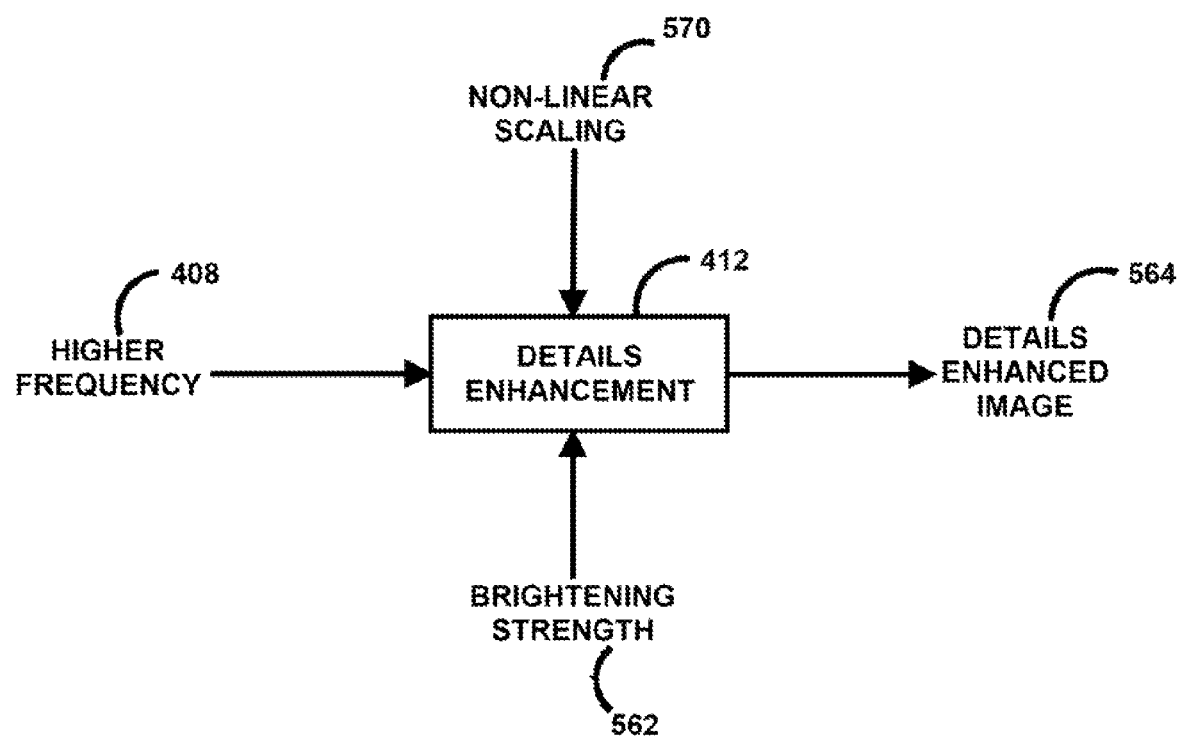
FIG. 22 illustrates another details enhancement technique.

Referring to FIG. 22, the details enhancement 412 receives the relatively higher frequency aspects 408 of the input image 400. The details enhancement 412 receives a non-linear scaling factor 570. The details enhancement 412 receives the brightening strength 562 from the image brightening process 410. The details enhancement 412 may modify the relatively higher frequency aspects 408 of the input image 400 by the non-linear scaling factor 570 and/or the brightening strength 572 to provide the details enhanced image 564. The non-linear scaling may be a S-shaped curve, based upon code values.

The image brightening 410 may use any suitable technique to determine a brightened image. Preferably the image brightening 410 is modified based upon the content of the lower frequency aspects 404 of the input image 400. The image brightening 410 may provide a brightened enhanced image 580. The image brightening 410 also preferably provides the brightening strength 562 which is based upon the amount of brightening applied to the lower frequency aspects 404 of the input image 400.

Figure 23:
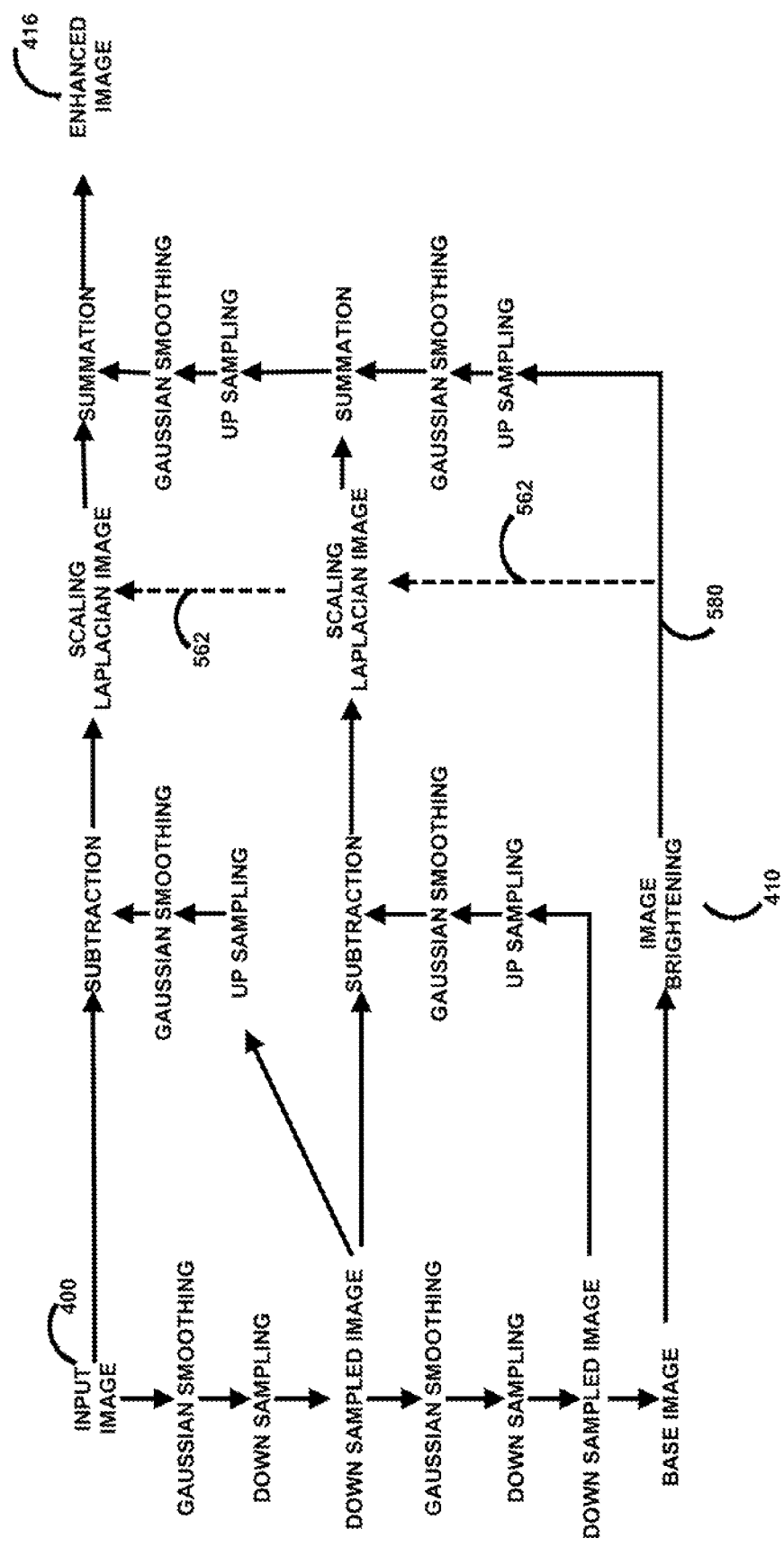
FIG. 23 illustrates combining based upon a details enhanced image and a brightened enhanced image when using a multiple scale pyramid decomposition technique.

Referring to FIG. 23, the combining 414 may be based upon the details enhanced image 564 and the brightened enhanced image 580 to provide the enhanced image 416. In the case that the lower frequency aspects 404 of the input image 400 are obtained using a multiple scale pyramid decomposition technique, then the image brightening 410 is preferably applied to the lowest resolution image 512. The combining 414 may be based upon pyramid reconstruction, where the Laplacian details are added to the brightened image at each pyramid level, and the Laplacian details are scaled with the brightening factor.

Figure 24:
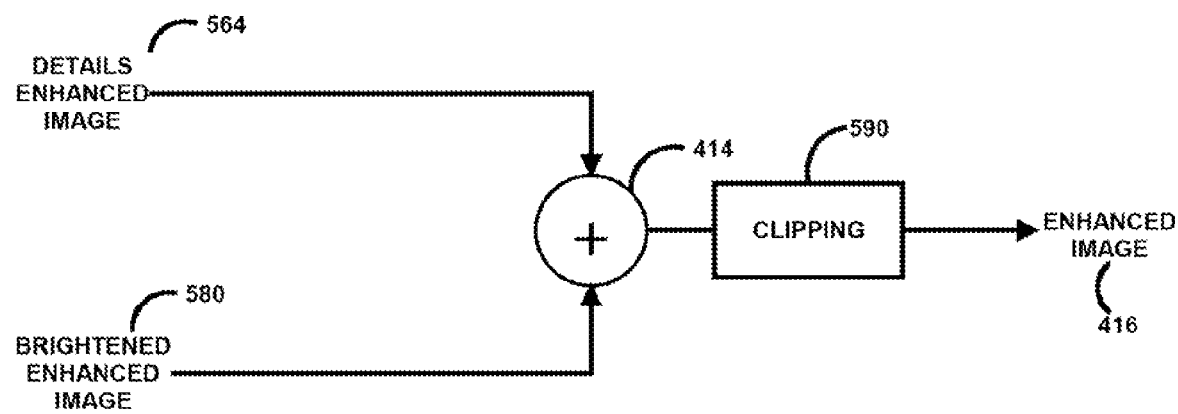
FIG. 24 illustrates an image clipping process based technique.

Referring to FIG. 24, the combining 414 may be based upon the details enhanced image 564 and the brightened enhanced image 580 to provide the enhanced image 416. In the case that the lower frequency aspects 404 of the input image 400 are obtained using a single scale technique (e.g., low-pass filtering or Laplacian filter), then the combining 414 may be based upon adding the two images 564, 580 together followed by a color preservation based clipping operation 590. The clipping operation may substantially maintain the hue of the pixels the same while mapping the pixel values into a suitable range, such as 0 to 255. For example, the enhanced image 416 may be provided by the clipping 590 by R2, G2, B2 =(255/M)*(R1, G1, B1), where R1, G1, B1 is the pixels of the summed image 414, M=max(255, R1, G1, B1). Accordingly, if the maximum is 255 then the scaling is unity, and if the pixel value is negative it is preferably clipped to zero.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A computer-implemented method for enhancing an input image comprising:
   (a) said computer receiving an input image and determining lower frequency aspects of said image and higher frequency aspects of said image using a multi-scale pyramid decomposition;
   (b) said computer modifying the brightness of said image, wherein said modifying is greater for said lower frequency aspects of said input image relative to said higher frequency aspects of said input image and is based upon a brightening process that applies a strength selection from among a range of potential strength selections that each brighten the input image, where said strength selection is based upon a selected backlight level of a display to display said input image;
   (c) said computer modifying the higher frequency aspects of said input image based upon an enhancement process that uses said strength selection;
   (d) said computer combining said modified said image based upon said brightening process of said input image and said modified said image based upon said enhancement process of said input image; where
   (e) the brightening process to the lower frequency aspects of said input image are only applied to a lowest resolution image in the pyramid decomposition technique and where Laplacian details of the input image are scaled using the brightening factor and added at each pyramid level.

2. The method of claim 1 wherein said pyramid decomposition is based upon a Gaussian smoothing.

3. The method of claim 2 wherein said pyramid decomposition is based upon a down sample technique.

4. The method of claim 3 wherein said pyramid decomposition is based upon an up sampling technique.

5. The method of claim 4 wherein said pyramid decomposition is based upon a first Gaussian smoothing, followed by a first down sampling, followed by a second Gaussian smoothing, followed by a second down sampling to identify said lower frequency aspects of said input image.

6. The method of claim 5 wherein a first up sampling follows said first down sampling, followed by a third Gaussian smoothing to identify said higher frequency aspects of said input image.

7. The method of claim 6 wherein a second up sampling follows said second down sampling, followed by a fourth Gaussian smoothing to identify other frequency aspects of said input image.

8. The method of claim 1 wherein lower frequency aspects of said input image and said higher frequency aspects of said input image are determined based upon a high pass filter.

9. The method of claim 1 wherein lower frequency aspects of said input image and said higher frequency aspects of said input image are determined based upon a single scale Laplacian filter.

10. The method of claim 9 wherein said Laplacian filter includes a filter kernel of $$\begin{matrix} 1 & 1 & 1 \\ 1 & -8 & 1 \\ 1 & 1 & 1. \end{matrix}$$

11. The method of claim 9 wherein said Laplacian filter may use a 3x3 filter kernel such as $$\begin{matrix} 0 & 1 & 0 \\ 1 & -4 & 1 \\ 0 & 1 & 0. \end{matrix}$$

12. The method of claim 1 wherein said enhancement process is based upon a constant scaling factor.

13. The method of claim 1 wherein said enhancement process is based upon a non-linear scaling factor.

14. The method of claim 13 wherein said non-linear scaling factor is a S-shaped curve.

15. The method of claim 14 wherein said curve is based upon code values.

16. The method of claim 6 wherein said combining is based upon pyramid reconstruction.

17. The method of claim 1 wherein a clipping process is applied to the combined image.

18. The method of claim 17 wherein said clipping process substantially maintains the hue of the combined image.

* * * * *